Dec. 23, 1958  B. F. KROUSE  2,865,224
CONTROL APPARATUS
Filed Jan. 11, 1954

INVENTOR.
BENJAMIN F. KROUSE
BY
George H Fisher
ATTORNEY

United States Patent Office 2,865,224
Patented Dec. 23, 1958

2,865,224

CONTROL APPARATUS

Benjamin F. Krouse, Minneapolis, Minn., assignor to Minneapolis-Honeywell Regulator Company, Minneapolis, Minn., a corporation of Delaware Application January 11, 1954, Serial No. 403,219

4 Claims. (Cl. 74—501)

This invention relates to cables, and particularly to coupling or attachment means between a main control cable and an auxiliary (or servo cable). The invention is of particular applicability for use in aircraft control systems although it is to be understood that it is not limited to such use.

The trend in the aircraft industry for some years has been toward automatic control of the aircraft. Thus, the various objects to be controlled on the aircraft, such as the control surfaces, are under the direct control of the pilot, main control cables generally transmitting the mechanical force developed by the pilot from him to the control surface. Also the pilot is able to relinquish control of the aircratf to the automatic means which generally comprises in part a servomotor, the mechanical output of which actuates the control surface. It is sometimes desirable and possible to mount the servomotor near the control surface so that there is no problem of connecting the output of the servomotor to the control surface. At other times, however, due to space limitations near the control surface and for other reasons, it is necesasry and/or desirable to mount the servomotor at a point on the airframe remote from the control surface and interconnect the servomotor to the control surface with servo cable means. In the latter situation it is customary to attach the ends of the servo cable to intermediate points on the main control cable and thus transmit the force from the servomotor to the control surface through the main control cables in somewhat of an indirect fashion by utilizing the servo cable and a part of the main control cable. This invention is concerned with an improved method of attaching the servo cable to the main control cable.

An object of the invention is to provide an improved method of attaching servo cables to main control cables whereby the pull of the servo cable on the main control cable is substantially axially or longitudinally of the main control cable as compared to prior art arrangements which had a tendency to distort and set up stresses in the main control cable due to the servo cable imparting a turning moment to the main cable at the point of attachment.

A further object is to provide a method of attaching a servo cable to a main control cable without changing the length of the main control cable as compared to prior art arrangements which required, when attaching a servo cable to an already installed main control cable, the changing in length or sometimes the complete recabling of the main control system. A further ob'ect therefore is the saving in cost of materials and labor in installing a servo system to an already installed control system.

Still another object of the invention is to provide a method of attaching a servo cable to a main control cable whereby the servo cable may be detached from the main control cable without "dropping" the preset tension in the main control cable.

Another object of the invention is to provide a method of attaching a servo cable to a main control cable whereby a pre-existing element on the main control cable such as a tension setting turnbuckle is utilized as part of the means of attaching the servo cable.

Further objects of the invention will become apparent upon reading the following detailed description of the invention in conjunction with the accompanying drawings wherein.

Figure 4:
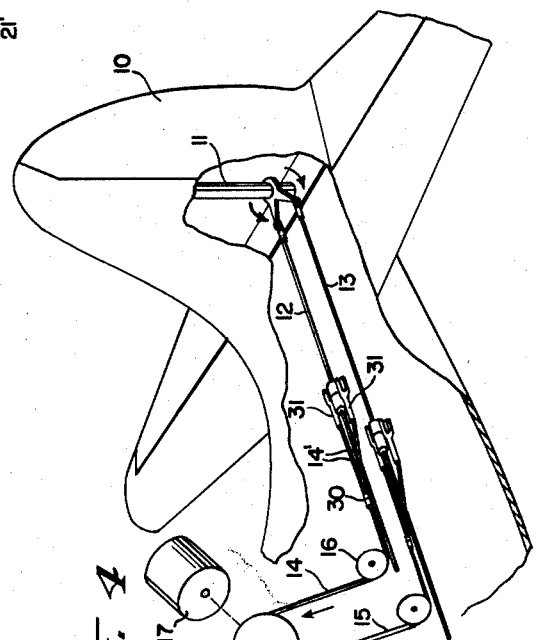
Figure 4 is an illustration of how the invention would be utilized in an aircraft and shows how a servo cable would be attached to a main control cable.

Figure 4 represents the tail section of an aircraft wherein a control surface 10 is adapted to be displaced in accordance to rotation of a shaft member 11. Shaft 11 in turn is adapted to be rotated in accordance to rotative torques thereon produced by main control cables 12 and 13 which are attached to the ends of bell crank or the like which in turn are rigidly fastened to shaft 11. Main control cables 12 and 13 are adapted to extend forwardly to the pilot's area of the aircraft wherein the pilot can manually control the control surface 10 by depressing pedals, turning a wheel, moving levers or the like. The control surface 10 is also adap'ed to be varied in accordance to actuation of a servomotor 17, which in turn would have servo cables operatively connected to it. In Figure 4 is shown two servo cables 14 and 15, it being understocd that servo cables 14 and 15 are adapted to be connected to the mechanical output of the servomotor 17 such as being wound on a cable drum 18.

Servo cables 14 and 15 are adapted to be connected to main control cables 12 and 13 respectively by separate but identical means. For purposes of simplicity, therefore, only the attachment of servo cable 14 to main control cable 12 will be explained. Servo cable 14 is adapted to be connected to main control cable 12 by an improved method which sometimes includes in part a pulley member 16 so that the pull of the servo cable on the main control cable 12 is substantially axially or longitudinally of the main control cable 12.

As will become apparent from the discussion below, it is not always necessary to use pulley member 16 so it is to be understood that the invention is not to be so limited. The method of connecting the servo cable 14 to the main control cable 12 is shown in greater detail on Figures 1, 2, and 3.

A part of each main control cable 12 and 13 is a tension setting turnbuckle barrel 20 with associated turnbuckle stud ends 21 and 22 which are respectively secured to ends of main control cable 12. Main control cable 12 is secured to turnbuckle members 21 and 22 by a swaging or other suitable process. Stud members 21 and 22 are externally threaded and the turnbuckle barrel member 20 is internally threaded as at 23 and 24, the direction of rotation of the threads being reversed so that by holding members 21 and 22 fixed and rotating barrel member 20, the members 21 and 22 are drawn toward one another or are moved away from one another in the well known fashion so that the tension in control cable 12 may be adjusted. The barrel member 20 of the turnbuckle has at its midsection an external shoulder portion 25, which shoulder may be made either by machining the barrel or by any other suitable means. As is shown in Figure 4 of the Mead et al. Patent 2,540,590, it is not uncommon to have turnbuckle barrels manufactured with a center shoulder thereon. Other turnbuckles are manufactured with its outer surface being tapered from the middle toward both of its ends. In this latter case, the shoulder 25 can be produced by the above mentioned machining operation. A plurality of holes 26 in shoulder portion 25 provide a means of "safety wiring" the attachment means to the turnbuckle, if such safety wiring is desired. Holes 26 are preferably spaced 90 degrees apart, but may be spaced otherwise consistent with good design.

In the installation of main control cables 12 and 13, as above indicated, it is customary to install a turnbuckle so that a means is available for setting the tension in the main control cable system. It follows therefore that the turnbuckle is inserted into the main control cable at a point at which it may be reached without too much difficulty for installation and servicing purposes. One of the advantages of this invention is that the accessible location of the turnbuckle is utilized in that there inherently is sufficient room at this point to mount the servomotor with its associated cables, pulleys and the like. It has been found in actual practice that when aircraft are equipped with servo control apparatus subsequent to the aircraft leaving the airframe manufacturer, that the turnbuckles on the main control cables are generally in a position wherein they can be utilized in the manner set forth herein so as to save much time and labor. Also, when the servo equipment is to be installed by the airframe manufacturer during the initial construction of the aircraft, it follows that the turnbuckles on the main control cables may be deliberately positioned so as to be in the most favorable location with respect to the servomotors.

Figure 1:
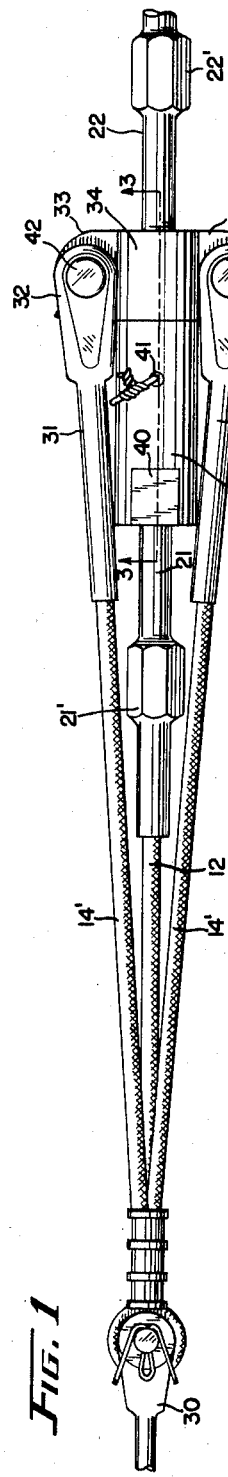
Figure 1 is a plan elevation of the improved method of attaching a servo cable to a main control cable.
Figure 2:
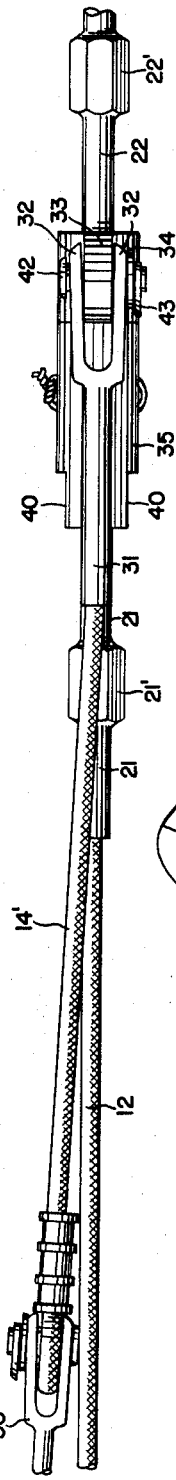
Figure 2 is a side elevational view of the arrangement shown in Figure 1.
Figure 3:
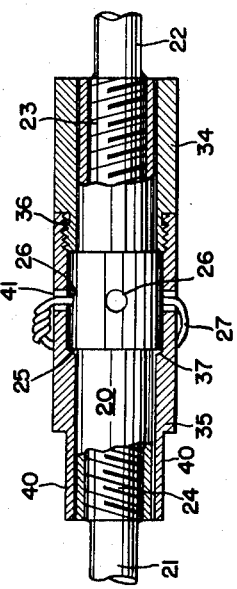
Figure 3 is an enlarged view, partly in section, of the turnbuckle and attachments shown in Figures 1 and 2 taken along section lines 3—3 in Figure 1.

Referring now to Figures 1, 2, and 3 it is seen that the main control cable 12 terminates in the turnbuckle stud portions 21 and 22 which in turn are threaded into the turnbuckle barrel 20. The servo control cable 14 terminates in a clevis 30 which in turn is operatively connected to a pair of auxiliary servo cable ends 14'. Each of the auxiliary servo cable ends 14' terminates in a clevis member 31. Clevis members 31 are provided with spaced arms or jaw members 32 which are adapted to lie on opposite sides of lug portions 33 of a cable eye 34. Cable eye 34 is one of two cooperating attachment members, the other being cable eye barrel 35 which are respectively externally and internally threaded as at 36 so that the two may be screwed together from opposite sides of shoulder portion 25 of the turnbuckle barrel 20 in a manner whereby the threaded end of cable eye 34 and an internal shoulder 37 in the cable eye barrel 35 form an internal recess in the attachment. The thus formed recess cradles shoulder 25 and thus prevents axial or longitudinal movement of the attachment with respect to the turnbuckle but does not prevent rotation of the attachment with respect to the turnbuckle. Flat portions 40 are provided on the unthreaded end of cable eye barrel 35 so as to provide a tool receiving surface and thus a means of imparting a rotative torque to the same for purposes of screwing cable eye barrel 35 and cable eye 34 together. Cable eye barrel 35 has a plurality of holes 41 therein which cooperate with holes 26 in the turnbuckle barrel 20 so that the attachment assembly and the turnbuckle barrel 20 may be safety wired if desired by means of safety wire 27 to one another. Headed pin members 42 extending through holes in the arm portions 32 of clevis members 31 and corresponding holes in lug portions 33 of the cable eye 34 fix clevis members 31 with respect to the lugs 33 and thus the cable eye 34 and cable eye barrel 35. Cotter pins or other similar means 43 are used in the usual fashion to prevent pin members 42 from being withdrawn from clevis members 31.

It has been found in practice that the servo cable 14 should be run off parallel or substantially parallel to the main control cable 12 for a distance before changing the direction of the servo cable 14 through some medium such as a pulley member 16. One arrangement that has worked very well is to have a one-half inch spacing between servo cable 14 and main control cable 12 and a 20 inch spacing between the point of attachment and pulley 15. This insures that for all practical purposes the pull by servo cable 14 upon the main control cable 12 will be an axial one or longitudinal one. Further, due to the fact that clevis members 31 are attached to the cable eye 34 at diametrically opposed points, the resultant pull on the attachment assembly is balanced and thus there is, for all practical purposes, a pull on the main control cable which has no turning moment whatsoever.

In practice, the servo attachment would be placed on an already installed main control cable system in the following manner. The cable eye barrel 35 would be slipped over the threaded end of turnbuckle stud member 21 and the cable eye 34 would be slipped over the threaded end of turnbuckle stud member 22. The turnbuckle assembly 20, 21, and 22 would then be screwed together to the desired tension of main control cable 12, utilizing at this point hexagon surfaces 21' and 22' on the stud members 21 and 22 respectively to hold members 21 and 22 fixed while member 20 is rotated. The cable eye 34 and the cable eye barrel 35 would then be screwed together at 36 with the safety wire 27 if desired being subsequently inserted through holes 26 and 41. The clevis members 31 attached to the ends of auxiliary servo cables 14' would then be positioned so that their spaced arms 32 extend on both sides of the lug portions 33 of the cable eye 34. Headed pins 42 would then be inserted through the cooperating holes in the clevis arms and the lugs 33. Additional turnbuckle means then could be used if desired on the servo cable 14 so as to adjust the tension of the servo control cable.

It will be appreciated that the servo cable 14 can be detached from the main control cable 12 with a minimum of effort. All that is necessary is to release the tension in the servo control cable by its turnbuckle, if one is used, and then merely detach clevis members 31 from the lug portions 33 on the cable eye 34 by withdrawing pin members 42. With this arrangement the tension setting in the main control cable 12 has not been substantially affected and resulting difficulties such as cables slipping off of pulleys are avoided.

While I have shown and described a specific embodiment of this invention, further modifications and improvements will occur to those skilled in the art. I desire it to be understood therefore that this invention is not limited to the particular form shown and I intend in the appended claims to cover all modifications which do not depart from the spirit and scope of this invention.

What I claim is:

1. A control system comprising a main control cable including a rotatably adjustable turnbuckle, a servo control cable, means to connect said servo control cable to said main control cable, said last named means comprising an enlargement or shoulder on said turnbuckle, said enlargement or shoulder on said turnbuckle including an annular abutment substantially normal to the longitudinal axis of said turnbuckle, a first and second recessed attachment member positioned on said control cable so as to overlie said enlargement or shoulder, an annular abutment on said second recessed attachment member cooperating with said annular abutment on said turnbuckle, means securing said attachment members to one another such that a force from said servo cable will be substantially longitudinal on said main control cable, means for securing said servo cable to said attachment members, said securing means being readily removable therefrom, and said turnbuckle being adjustable without removing said servo cable.

2. In a control system: an object to be controlled; a first cable for controlling said object; means including a second cable for operatively connecting a control device to said object for the control thereof, said last named means comprising a member secured to said first cable of greater diameter than said first cable, said greater diameter including an annular shoulder or abutment substantially normal to the longitudinal axis of said first cable, attachment means positioned about said member, said attachment means including an annular shoulder or abutment in cooperation with said annular shoulder or abutment of said member of greater diameter than said first cable, and means on said second cable connected to diametrically opposed portions of said attachment means, said attachment means being rotatable with respect to said member but longitudinally fixed thereto, said attachment means transmitting force from said control device to said first cable along said first cable's longitudinal axis, and said attachment means being readily removable therefrom.

3. Apparatus of the class described comprising in part: a control cable having integral therewith a rotatably adjustable tension setting sleeve, a portion of said sleeve being of greater diameter than said cable, a shoulder or abutment formed by said portion of said sleeve of greater diameter than said cable, first and second clamping members positioned about said portion, a shoulder or abutment formed by one of said clamping members cooperating with said shoulder or abutment of said portion of said sleeve, means securing said members together so that the assembly thereof is rotatable with respect to said portion but is longitudinally fixed with respect to said portion, a servo cable, two flexible cable ends extending from said servo cable, and means securing said ends to diametrically opposed points on said assembly such that transmission of force from said servo cable to said control cable is along the longitudinal axis of said control cable and said securing means is readily removable.

4. Apparatus for attaching a servo cable to a control cable comprising a member positioned on said control cable and of greatere diameter than said control cable, a shoulder or abutment formed by said member, attachment means positioned about said member so as to be rotatable therewith but longitudinally fixed thereto, a shoulder or abutment being a part of said attachment means and cooperating with said shoulder or abutment on said member, means attaching said servo cable to said attachment means such that the force transmitted from said servo cable to said control cable will be substantially in the longitudinal axis of said control cable, and said means attaching said servo cable to said attachment means being readily removable.

References Cited in the file of this patent

UNITED STATES PATENTS

| | | |
|---|---|---|
| 677,036 | Laurent | June 25, 1901 |
| 1,423,202 | Fellows | July 18, 1922 |
| 1,777,742 | Biggin | Oct. 7, 1930 |
| 1,971,472 | Wolf | Aug. 28, 1934 |
| 1,973,502 | Olson | Sept. 11, 1934 |
| 2,155,421 | Kenyon | Apr. 25, 1939 |
| 2,373,776 | Parr | Apr. 17, 1945 |
| 2,443,192 | Moeller | June 15, 1948 |